(12) United States Patent
Bentrim (10) Patent No.: US 9,623,571 B2
(45) Date of Patent: Apr. 18, 2017

(54) PICK AND PLACE NOZZLE ADAPTOR

(71) Applicant: Penn Engineering & Manufacturing Corp., Danboro, PA (US)

(72) Inventor: Brian Bentrim, Furlong, PA (US)

( * ) Notice: Subject to any disclaimer, the term of this patent is extended or adjusted under 35 U.S.C. 154(b) by 0 days.

(21) Appl. No.: 14/973,277

(22) Filed: Dec. 17, 2015

(65) Prior Publication Data

US 2016/0176056 A1    Jun. 23, 2016

Related U.S. Application Data

(60) Provisional application No. 62/094,243, filed on Dec. 19, 2014.

(51) Int. Cl.
*B25J 15/06* (2006.01)

(52) U.S. Cl.
CPC ....... *B25J 15/0633* (2013.01); *B25J 15/0625* (2013.01); *B25J 15/0666* (2013.01)

(58) Field of Classification Search
CPC  B25J 15/0616; B25J 15/0633; B25J 15/0641; B25J 15/0666; Y10S 901/40
USPC ............... 294/183, 186, 187; 414/752.1
See application file for complete search history.

(56) References Cited

U.S. PATENT DOCUMENTS

| | | | | |
|---|---|---|---|---|
| 3,558,171 | A * | 1/1971 | Netsch et al. | B66C 1/0212 294/186 |
| 3,602,543 | A * | 8/1971 | Sjodin | B66C 1/0212 248/363 |
| 4,708,381 | A * | 11/1987 | Lundback | B65G 47/91 248/362 |
| 6,851,733 | B2 * | 2/2005 | Mori | B65G 47/91 29/743 |
| 7,086,675 | B2 * | 8/2006 | Jacobs | B65G 47/90 294/183 |
| 8,262,146 | B2 * | 9/2012 | Stoppel | H01L 21/67132 29/743 |
| 8,540,296 | B1 * | 9/2013 | Wu | B25J 15/0616 294/183 |

* cited by examiner

*Primary Examiner* — Dean Kramer
(74) *Attorney, Agent, or Firm* — Ryder, Lu, Mazzeo & Konieczny LLC; Joseph M. Konieczny, Sr.; Gregory J. Gore (57) ABSTRACT

A releasable adaptor is carried on the end of the pick-and-place vacuum nozzle which diffuses and restricts the air flow access of the nozzle to the top surface of an apertured fastener such as a nut while covering the fastener hole. The adaptor allows a standard nozzle to develop sufficient suction to lift the nut/adaptor combination and transport it to its desired target location such as a circuit board. There, the nut is released from the adaptor, which is then lifted by the nozzle and transported back to the supply location. This functionality is achieved by a unique adaptor air valve which the PNP equipment operates both mechanically and through its controlled application of negative air pressure applied to the adaptor by the nozzle.

16 Claims, 8 Drawing Sheets

PICK AND PLACE NOZZLE ADAPTOR

RELATED APPLICATIONS

This is a non-provisional patent application related to provisional application No. 62/094,243 entitled "Pick and Place Nozzle Adaptor" filed on Dec. 19, 2014, priority from which is hereby claimed.

FIELD OF THE INVENTION

The present invention relates to automated pick-and-place manufacturing assembly machines, which take individual parts from a supply location and place them into a designated position with other components of a greater assembly. More specifically, it relates to pick-and-place robotics used in the electronics industry for placing components onto a circuit board.

BACKGROUND OF THE INVENTION

Pick-and-place machines (hereinafter "PNP") for positioning components onto a circuit board have been used for many years. In one such system, a robotic transport arm has a vacuum line and a nozzle at the end that lifts components from a supply station and delivers them to a specific location on a circuit board. To achieve this step, the individual component must have a top surface that will form a vacuum seal with the nozzle tip. Components that have through holes ("apertured components"), such as internally threaded fasteners, present a problem since the hole in their top surface is not conducive to drawing a vacuum by a standard nozzle tip. Nozzle tips cannot be custom designed for each different part because many differently-shaped components must be delivered by the same nozzle to the same circuit board in sequence.

To solve this problem, it is known to add a piece of adhesive tape to the top of the apertured component to seal off the hole. The tape creates a uniform planar surface with which the nozzle tip can sufficiently vacuum seal so that component can be lifted. However, this solution is not ideal since it requires an additional sacrificial element be applied to the apertured component and then later removed. Applying tape adds cost, slows production rates and creates used tape scrap. It is therefore desirable to provide the electronics industry an automated assembly means that can efficiently handle apertured components using standard PNP equipment.

SUMMARY OF THE INVENTION

In one preferred embodiment, an adaptor is provided that can be used with apertured components, which avoids the need to first temporarily seal the aperture in the component. The adaptor is releasable and travels on the end of the PNP nozzle. The adaptor diffuses and restricts the air flow access of the nozzle to the top surface of the apertured component, such as a nut, while covering the central aperture. The adaptor enables a standard nozzle to develop sufficient suction to lift the nut/adaptor combination and transport it to its desired location such as a hole in a circuit board. At the target location, the component is released from the adaptor, which is then lifted by the nozzle and transported back to the supply location. The nozzle adaptor achieves this functionality using a unique air valve, which the PNP operates both mechanically and through its controlled application of air pressure applied to the adaptor by the PNP nozzle.

In one preferred embodiment, the PNP nozzle adaptor has a body with a top, a bottom, and a central axial bore. The body has a manifold cavity, which is open at the bottom and has a larger diameter than the bore that accepts the apertured component. A plunger is closely fitted within an internal shoulder in the bore, which has a reduced diameter. The plunger reciprocates between upwardly retracted and downwardly extended positions. An O-ring at the bottom of the plunger captivates the plunger within the body and limits its upward movement. An enlarged head at the top of the plunger limits its downward movement. A recoil spring is positioned and operative between the underside of the plunger head and the shoulder in the body to normally bias the plunger in the retracted position. The plunger has a vacuum chamber that is open at the top of the plunger. An extension on the bottom end of the plunger is adapted to cover the hole in the nut when the plunger is extended downward. At least one air intake port extends from the vacuum chamber laterally (radially) through the sidewall of the plunger near its bottom end. The shoulder covers the ports when the plunger is upwardly retracted. When the plunger is downwardly extended, the ports lie beyond the shoulder and are open to the manifold cavity. In this construction, the plunger acts as a slide valve which opens and closes the intake ports. Thus, the plunger can function both as a slide valve and a cover for the hole in the apertured component.

The spring-biased plunger is moved by the mechanical action of the nozzle against it. When the plunger is pushed downwardly to the extended position, the intake ports are open to the manifold cavity so that air can flow between the cavity and the chamber. In this position, the bottom of the plunger contacts the nut and seals off the hole. An annular step around the top of a recess at the bottom of the body also contacts and seals against the top surface of the apertured component. This construction enables a vacuum connection between the adaptor and the apertured component. When it is desired to release the component, the vacuum is stopped and the plunger is biased to the retracted position by the recoil spring as the nozzle is lifted a distance equal to the stroke of the plunger. In the retracted position, the intake ports are closed by the inner wall of the shoulder in the adaptor body. In this position, the vacuum chamber is only open to the PNP vacuum nozzle through the opening at the top of the plunger. In this position, suction can be re-applied to the adaptor, which can then be carried away by the nozzle with the apertured component left behind.

The operation of one embodiment of the invention may be more specifically described as follows. At a supply location, with an adaptor already placed on a nut, the PNP nozzle pushes the plunger downwardly against the biasing force of the recoil spring. This movement continues until the plunger contacts and covers the upper surface of the apertured component. The plunger valve connects ambient air in fluid communication with the top surface of the apertured component. Suction is then applied and the component is thereby forcefully captured in the lower cavity of the adaptor body. The component is then transported with the adaptor by the PNP to the desired circuit board location. The nut is then released from the adaptor by stopping nozzle suction. Then, the nozzle is moved upward, which allows the recoil spring to bias the plunger upward to the retracted position to close the valve between the vacuum source and the apertured component. With the valve closed, a vacuum is again drawn on the adaptor which is then lifted away from the component and back to the supply location where it is placed on the next component in the supply reel. The next component can then be taken or the adaptor can be released from the nozzle by terminating the suction. The nozzle can then move away from the supply reel to transport any other part to the circuit board.

The advantages of the nozzle adaptor of the present invention are provided by a simple, self-actuating device. The adaptors spring-actuated mechanism does not rely upon any motive force other than the mechanical force of the PNP nozzle and the negative air pressure it applies. Other advantages and differences will follow from the foregoing explanation and the following drawings and description of the invention. The preferred embodiment of the invention will provide one of skill in the art with a full understanding of what has been invented.

DESCRIPTION OF THE PREFERRED EMBODIMENT

A nozzle adaptor in accordance with a preferred embodiment is illustrated in FIGS. 1-5 and is designated generally by reference numeral 10. The nozzle adaptor 10 generally comprises a main body/housing 11, a plunger 13 and a recoil spring 15. With reference to the orientation shown in FIGS. 1 and 2, the plunger 13 reciprocates upwardly and downwardly within the housing. The recoil spring 15 normally urges the plunger 13 to the retracted position shown in FIG. 2A. The plunger 13 is shown in its extended position in FIG. 2B. It should be understood that although the main elements of this preferred embodiment are cylindrical, other shapes and sizes may be utilized.

Figure 1:
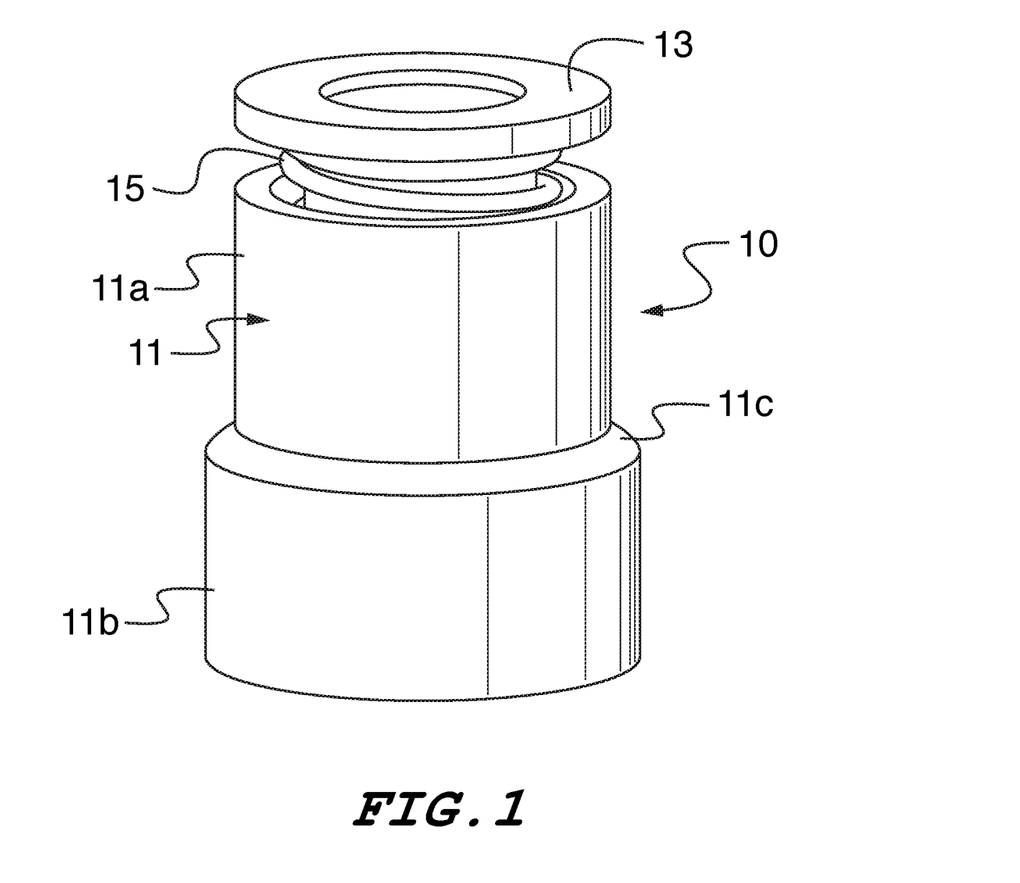
FIG. 1 is a top, front perspective of an adaptor in accordance with a preferred embodiment of the invention.
Figure 2A:
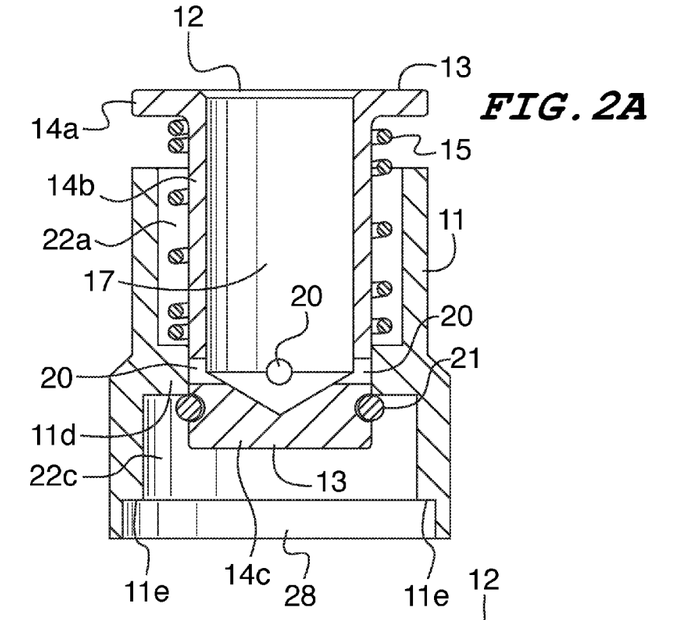
FIGS. 2A and 2B are side-by-side cross-sections showing the adaptor in the retracted and extended positions, respectively.
Figure 2B:
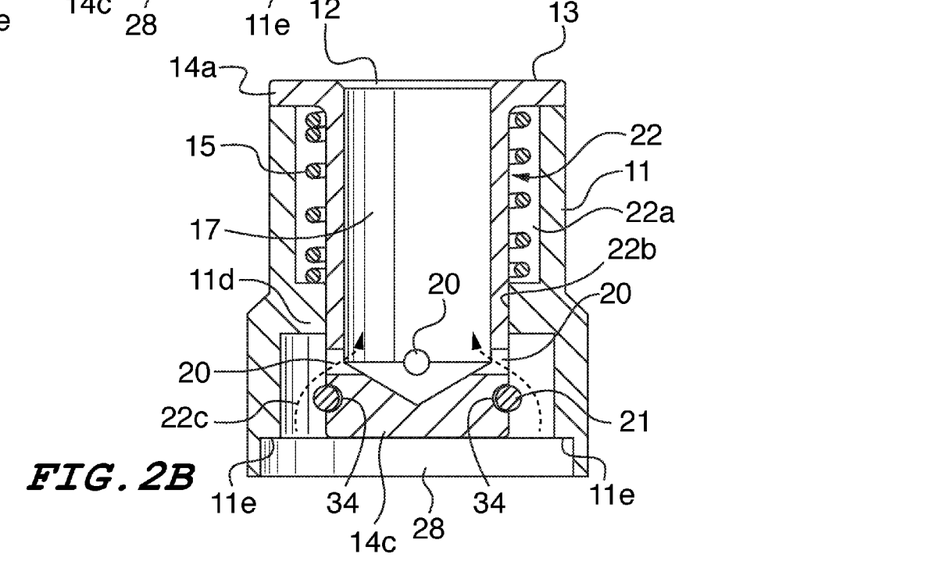

In FIG. 2A, the plunger is held retracted by the spring 15 and the air intake ports are closed by the shoulder 11d. In FIG. 2B, the plunger 13 is in the extended position and the intake ports 20 are open to the manifold cavity 23 (described below). Thus motion of the plunger between up and down positions acts as a slide valve which opens and closes the intake ports 20.

The body 11 of the adaptor 10 has a generally-cylindrical shape with an upper portion 11a and an enlarged-diameter lower portion 11b. The upper 11a and lower 11b portions transition at an external shoulder 11c and a first internal shoulder 11d. The inner walls of the body 11 define an internal, axial-extending central bore 22 extending entirely through the body 11. The central bore 22 has an upper portion 22a, a central portion 22b and a lower portion 22c defined by the interior walls of the upper portion 11a, first internal shoulder 11d, and lower portion 11b of the body 11, respectively. The lower portion 22c acts as a manifold cavity and has an enlarged recess 28 formed at the axial end of the lower portion 11b of the body. The enlarged recess 28 is co-axial with the central bore and forms a second internal shoulder 11e, which engages the top of the apertured component with which the nozzle is designed to be used. Preferably, the shape of the recess matches the shape of the apertured component so that the nozzle is centered on the apertured component. In one preferred embodiment, the recess 28 has a cylindrical shape that compliments the shape of the outer surface of a nut.

The plunger 13 has a generally-cylindrical shape with an enlarged head 14a at one end, side walls 14b, and an end wall 14c. A central, axial vacuum chamber 17 extends from the head 14a to the end wall 14c. A plurality of radially-extending ports 20 are located proximate the end wall 14c and extend through the side walls 14b. In the preferred embodiment shown in FIGS. 1-5, the ports 20 are equally spaced at 90-degree intervals around the perimeter of the plunger 13. An annular race 34 is formed in the outer surface of the side walls 14b proximate the end wall 14c. An O-ring 21 is seated in the race 34.

The spring 15 is captivated between the head 14a and the first internal shoulder 11d. The plunger 13 is captivated to the body 11 by the enlarged head 14a at the top and the O-ring seal 21 near the bottom, which abuts the bottom of the first internal shoulder 11d. The outer diameter of the side walls 14b is slightly smaller than but closely approximates the inner diameter of body 11 at the inner shoulder 11d. This close-fitting arrangement controls alignment of the plunger 13 within the body 11 as it reciprocates to open or close the ports 20. Referring to FIG. 2A, the ports 20 align with and are occluded by the central portion 11b of the side walls 14b. Referring to FIG. 2B, as the plunger 13 moves to the extended position wherein the ports 20 move into axial alignment with the lower portion 11c of the side walls 11. However, since the diameter of the sidewalls at this axial location is greater than the diameter of the plunger 13, the ports are un-occluded and create a fluid passageway from the manifold cavity 22c into the central vacuum chamber 17.

Figure 3A:
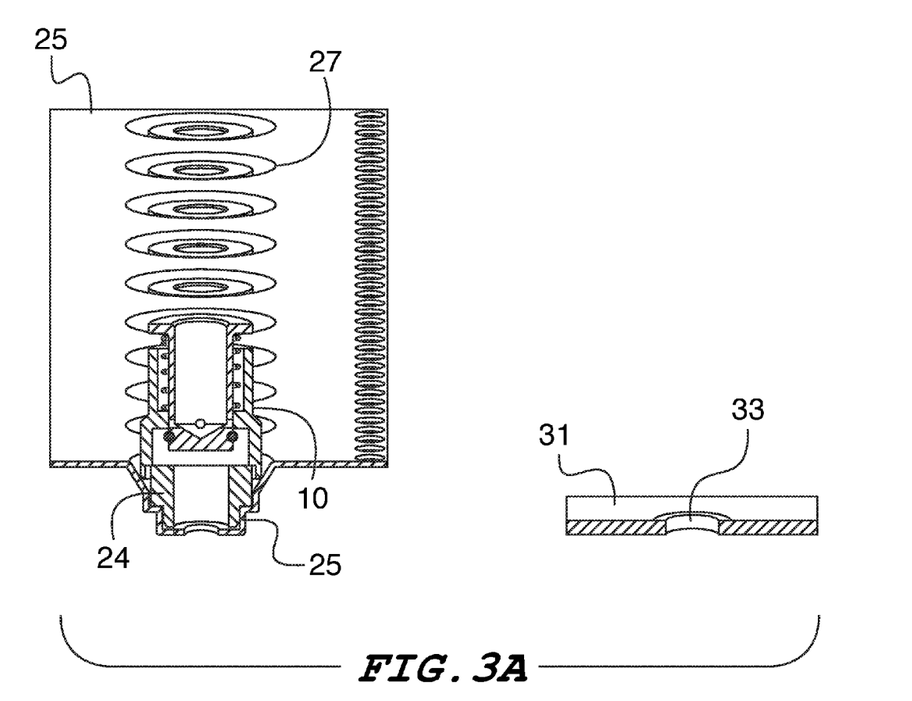
FIGS. 3A and 3B are sectional views of the nozzle adaptor interacting with a reel-supplied, apertured component before and after it is connected to vacuum pressure.
Figures 3B, 3C:
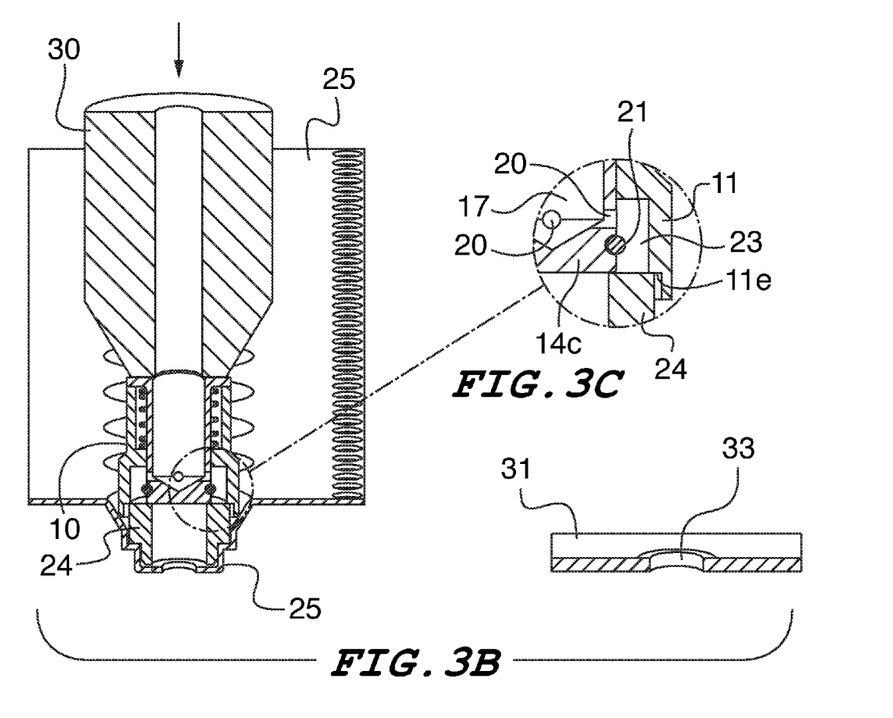
FIG. 3C is an enlarged fragmentary cross section.

FIGS. 3a-3d show the interaction between the nozzle adapter 10 and an apertured component 24 on a reel strip 25 of components 24. Referring now to FIG. 3A, an apertured component 24 such as a nut 24 is delivered to a home position by an advancing reel strip 25 that holds a row of similar components. The PNP provides motion and vacuum control to a standard lifting nozzle 30, such as shown in FIG. 3B, to remove an apertured component 24 from the reel strip 25 and insert it in the hole 33 of a circuit board, such as shown in FIG. 3B.

The adaptor 10 is initially positioned on the first nut 24 on the reel 25. In this first step, the plunger 13 is arranged in the retracted position as shown in greater detail in FIG. 2A. Next, the PNP depresses the plunger 13 to the extended position shown in FIGS. 2B, 3B and 3C by pushing on the head 14a against the resistive force of the recoil spring 15. Downward movement of the nozzle 30 is stopped when the apertured component 24 contacts the second internal shoulder 11e and the end wall 14c as seen in FIGS. 3B and 3C. In this position, the top of the apertured component 24 around the hole is covered by the end of the plunger 13. The manifold cavity 22c is also sealed off by engagement of top surface of the component nut 24 with the second internal shoulder 11e. Vacuum pressure is then applied to the vacuum chamber, which also creates an effective vacuum in the manifold cavity 22c since the cavity 22c is connected in fluid communication with the vacuum chamber 17 through the ports 20 as shown by fluid flow lines in FIG. 2B. The vacuum creates a releasable attachment between the component 24 and the adaptor 10. The vacuum is sufficient to overcome the force of the recoil spring 15 and the weight of the component/adaptor combination so that the component and adaptor can now be lifted by the PNP.

Figure 4A:
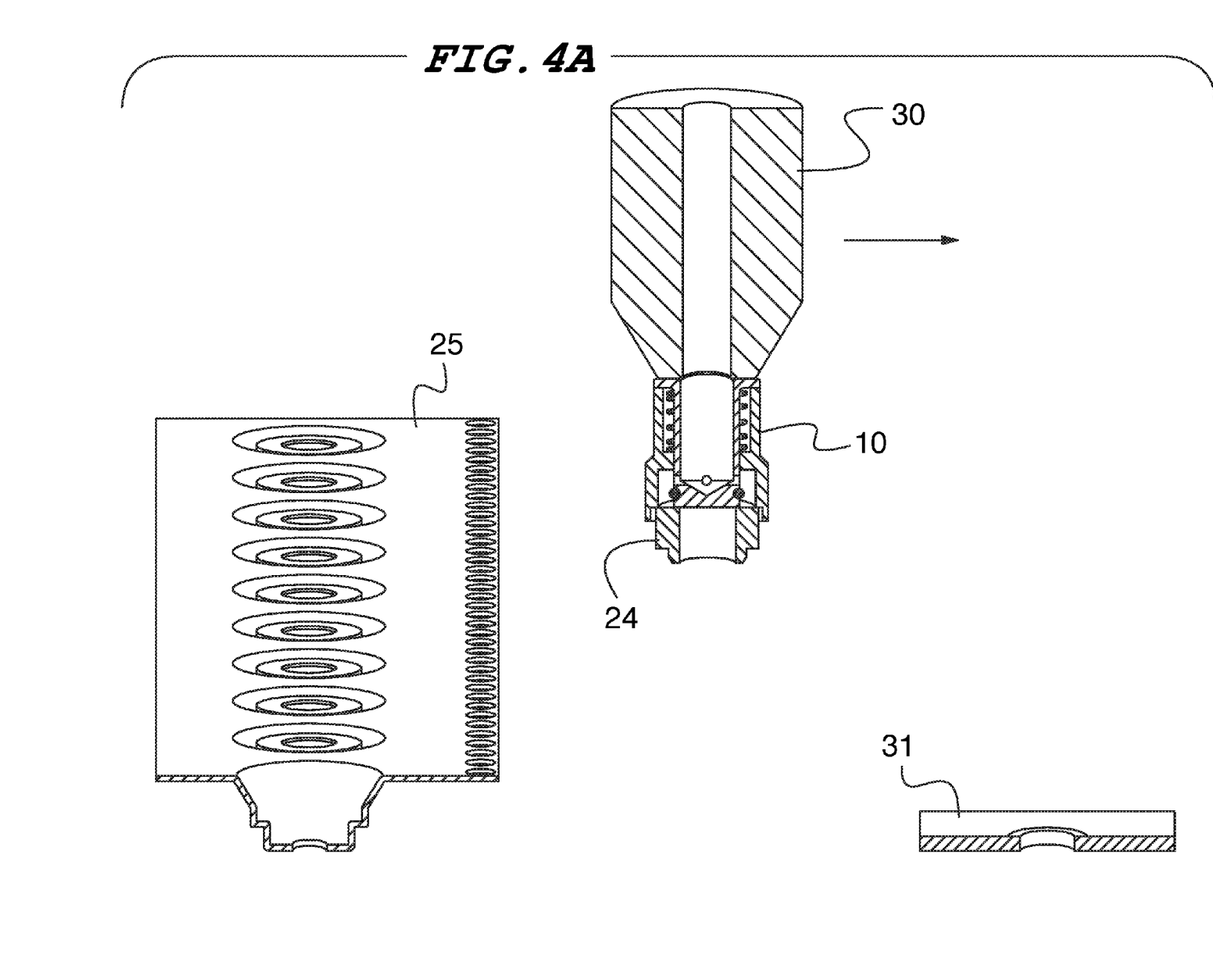
FIGS. 4A and 4B are sectional views of the nozzle adaptor transporting and inserting an apertured component on a circuit board; and, FIGS. 5A and 5B are sectional views of the nozzle adaptor releasing an apertured component on a circuit board and returning to a supply reel of additional apertured components.
Figure 4B:
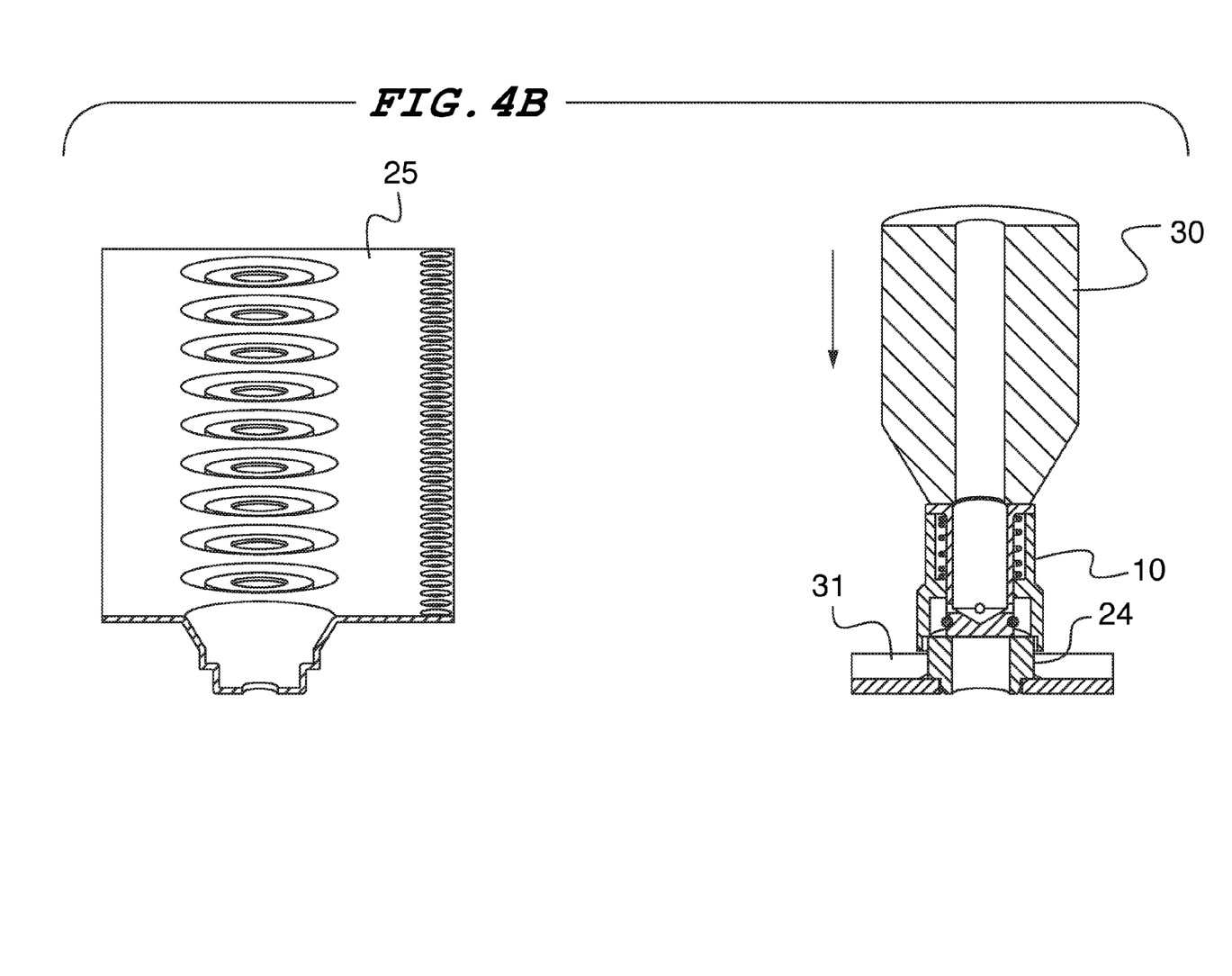
Figure 5A:
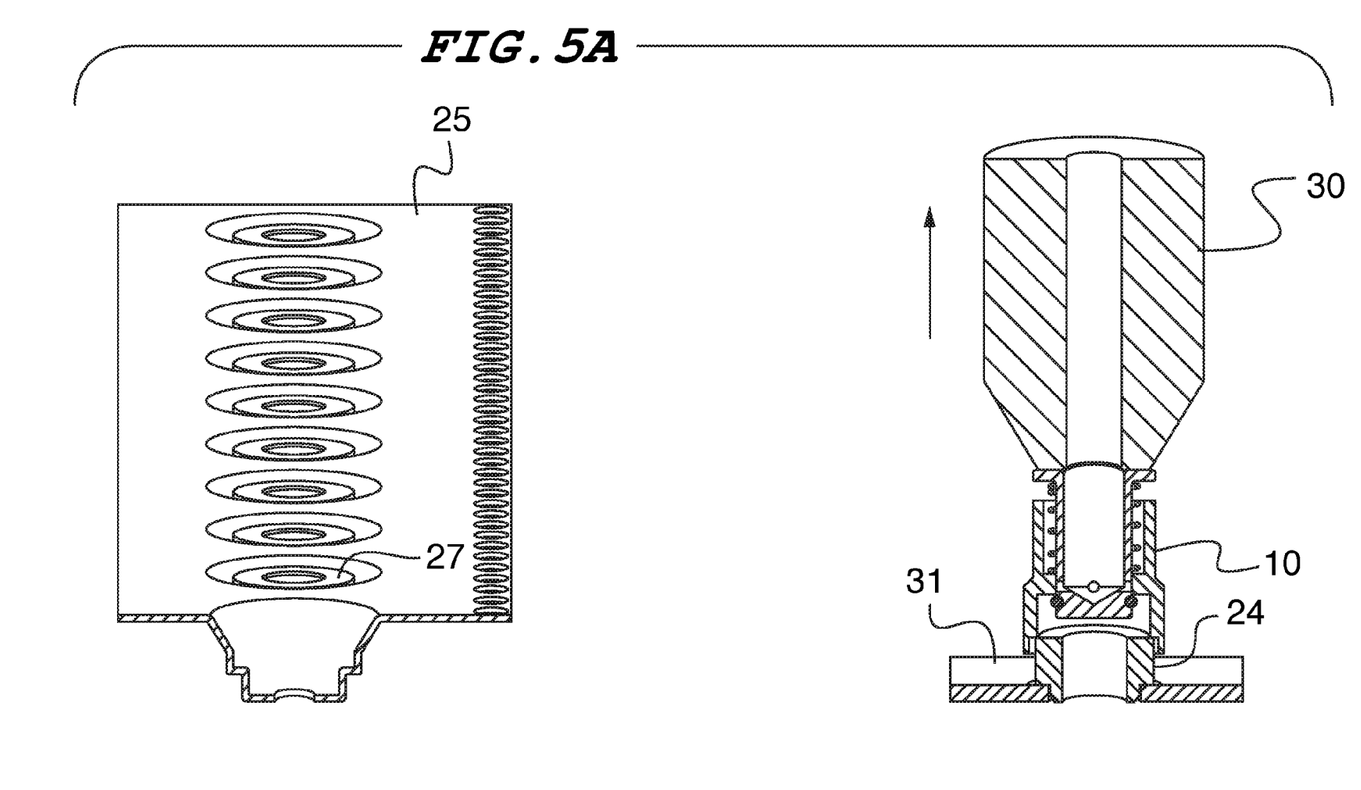
Figure 5B:
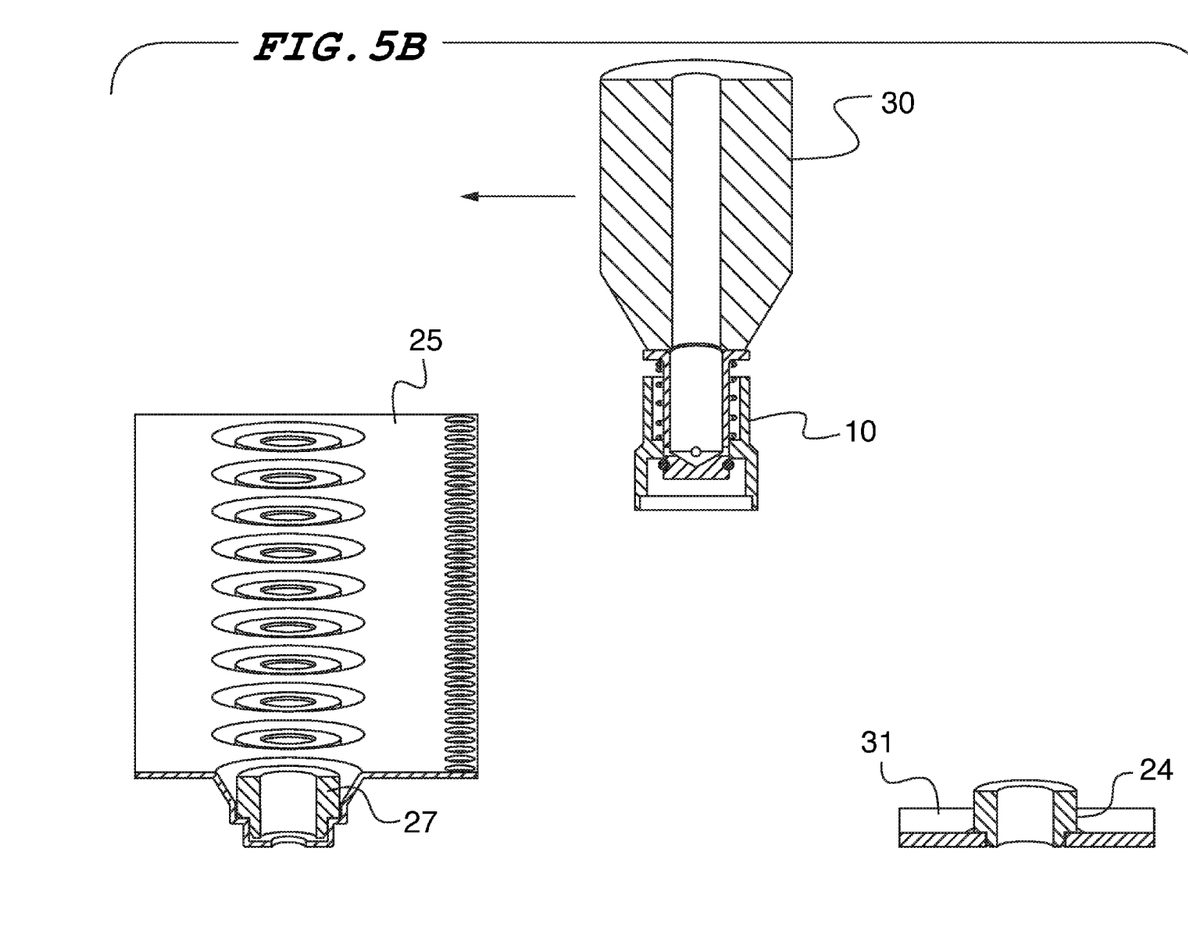

After the component 24 is removed from the reel strip 25, it is carried, as seen in FIG. 4A, and positioned in the receiving hole 33 of the circuit board 31, as seen in FIG. 4B. After the component 24 is placed on the circuit board 31, the vacuum is halted and the PNP lifts the nozzle 30 a small amount, which allows the plunger 13 to return to the retracted position shown in FIGS. 5a and 2A. In the retracted position, the air intake ports 20 are closed and the vacuum applied to the nut is relieved by air flow through the unsealed hole in the apertured component 24. Finally, the vacuum is re-applied to the vacuum chamber 17 so that the adaptor nozzle 10 can be lifted away from the component 24 and returned to the supply strip 25 as shown in FIG. 5B. The PNP can then acquire the next component 27 on the reel 25 and repeat the installation process.

In an alternative method of installing an apertured component, the nozzle adaptor 10 is left in place on the component 24 after it is placed in the receiving hole 33 on the circuit board 31. In this embodiment, a vacuum is not re-applied to the plunger 13 after the plunger is returned to the retracted position. The PNP nozzle is then moved away from the component 24 to pick and place another type of component located elsewhere that does not require the adaptor nozzle 10.

From the foregoing, it should be appreciated that the adaptor 10 for a PNP nozzle eliminates the requirement that apertured parts have a sacrificial hole seal. The foregoing is to be considered illustrative only of the principles and possible embodiments of the invention. Further, since numerous modifications and changes will be readily apparent to those skilled in the art, it is not desired to limit the invention to the exact construction and operation shown and described. Accordingly, suitable modifications and equivalents may be resorted to, all falling within the scope of the invention, which shall be determined only by the following claims and their legal equivalents.

The invention claimed is:

1. A nozzle adapter device for a vacuum pick-and-place machine, comprising:
    a body having a top, a bottom and a central axial bore, said body having a manifold cavity open at the bottom of the body of greater lateral dimension than said bore for receiving a part;
    a plunger slideably engaged within said bore and reciprocal between upwardly retracted and downwardly extended positions;
    a vacuum chamber within said plunger having an opening at a top of the plunger;
    a spring operative between the plunger and the body biasing the plunger to the upwardly retracted position;
    at least one air intake port passing through a sidewall of the plunger providing fluid communication between the vacuum chamber and the manifold cavity; and
    wherein said plunger is reciprocally operative such that by movement of the plunger the at least one port is open and in fluid communication between said vacuum chamber and said manifold cavity when the plunger is in the downwardly extended position and said at least one port is closed off from the vacuum chamber by the body when said plunger is in the upwardly retracted position.

2. The device of claim 1 further including an extension of the plunger located below the at least one intake port, said extension lying within the manifold cavity and adapted to cover a hole in said part when said plunger is in the downwardly extended position.

3. The device of claim 2 further including an outwardly stepped recess of enlarged diameter open at the bottom of the body adapted to receive the part.

4. The device of claim 3 further including an annular step around the top of the recess which engages a top surface of the part.

5. The device of claim 1 wherein the plunger has a head adapted for substantially air-tight engagement with a pick-and-place vacuum nozzle whereby a vacuum can be drawn upon the vacuum chamber through said opening at the top of the plunger.

6. The device of claim 1 wherein the plunger is closely fitted within an internal shoulder of the body of reduced diameter.

7. The device of claim 6 wherein the at least one intake port is closed by the shoulder when the plunger is in the upwardly retracted position.

8. The device of claim 1 wherein the manifold cavity is adapted to receive and releaseably attach a fastener part to the body only by a vacuum drawn upon the plunger vacuum chamber.

9. The device of claim 8 wherein the fastener part is a nut having a threaded bore.

10. The device of claim 9 wherein a bottom end of the plunger is adapted to engage the nut covering the bore.

11. The device of claim 8 wherein the manifold cavity has an internal annular step that is adapted to engage a top surface of the fastener part.

12. The device of claim 1 wherein the vacuum chamber is only open to the surrounding atmosphere through said opening at the top of the plunger when said plunger is in the upwardly retracted position.

13. The device of claim 12 further including a seal on the outside of the plunger that abuts an underside of the shoulder when the plunger is in the upwardly extended position.

14. The device of claim 13 wherein the seal limits the upward movement of the plunger and captivates the plunger within the body.

15. The device of claim 1 wherein the spring is a coil spring that surrounds the plunger and lies within the bore of the body.

16. The device of claim 1 wherein the spring is operative between an internal shoulder of the body of reduced diameter and an underside of a head of enlarged diameter at a top of the plunger.

* * * * *